US012634394B2

(12) United States Patent
Bondareva et al.

(10) Patent No.: US 12,634,394 B2
(45) Date of Patent: May 19, 2026

(54) QUALITY ALERTING FOR COMPUTER-AIDED DISPATCH SYSTEMS

(71) Applicant: MOTOROLA SOLUTIONS, INC., Chicago, IL (US)

(72) Inventors: Mariya Bondareva, Loxahatchee, FL (US); Roger D. Donaldson, Vancouver (CA); Volodymyr Rybalkin, West Valley, UT (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 186 days.

(21) Appl. No.: 18/394,088

(22) Filed: Dec. 22, 2023

(65) Prior Publication Data

US 2025/0211681 A1     Jun. 26, 2025

(51) Int. Cl.
*H04M 3/51*        (2006.01)
*H04M 3/22*        (2006.01)

(52) U.S. Cl.
CPC ....... *H04M 3/5116* (2013.01); *H04M 3/2218* (2013.01); *H04M 2201/40* (2013.01)

(58) Field of Classification Search
CPC ............. H04M 3/5116; H04M 3/2218; H04M 2201/40; H04M 3/5175; H04M 11/04;
(Continued)

(56) References Cited

U.S. PATENT DOCUMENTS

| | | |
|---|---|---|
| 7,106,835 B2 | 9/2006 | Saalsaa |
| 8,467,507 B2 | 6/2013 | Timmins et al. |

(Continued)

FOREIGN PATENT DOCUMENTS

| | | |
|---|---|---|
| CA | 2773749 C | 10/2018 |
| CN | 112804400 B | 4/2023 |

(Continued)

OTHER PUBLICATIONS

Mafera et al., "Method for Determining the Relatedness Between a Plurality of NG9-1-1 SMS Calls," Motorola Solutions, Inc., Nov. 19, 2013, pp. 1-5.
(Continued)

*Primary Examiner* — Akelaw Teshale
(74) *Attorney, Agent, or Firm* — Michael Best & Friedrich LLP

(57) ABSTRACT

Examples provide a public safety answering point server including a processor configured to determines that a call taker of the PSAP has received a call from a caller regarding an incident and generate a transcript of the call. Based on the transcript, the processor determines a set of call attributes associated with the call, and determines whether a computer automated dispatch ("CAD") record associated with the call is created within a threshold time period from the start time of the call. When the CAD record associated with the call is not created within the threshold time period, the processor infers, using a first artificial intelligence model, whether a CAD record should be created. In response to inferring that a CAD record should be created based on the set of call attributes, the processor generates and transmits a quality alert to an electronic device associated with a user of the PSAP.

20 Claims, 3 Drawing Sheets

(58) Field of Classification Search
CPC ......... H04M 2242/04; H04M 1/72418; H04M
1/72421; H04W 4/90; H04W 4/029;
H04W 4/02; H04W 76/50; H04W 4/021;
G08B 25/016; G08B 27/001; G08B
25/10; G08B 25/08; G08B 25/006; G08B
25/14; G08B 25/001; G08B 21/02; G08B
25/009; G08B 21/0269; G08B 25/005;
G08B 21/043; G08B 21/18; G08B
21/182; G08B 19/00; G08B 25/008;
G08B 17/00; G08B 21/0272; G08B
21/0453
See application file for complete search history.

(56) References Cited

U.S. PATENT DOCUMENTS

| | | | |
|---|---|---|---|
| 10,276,031 B1 | 4/2019 | Ho et al. | |
| 10,419,722 B2 | 9/2019 | Guzik | |
| 10,601,992 B2 | 3/2020 | Dwyer et al. | |
| 10,805,462 B1 * | 10/2020 | Ginter | H04L 67/563 |
| 10,868,910 B1 * | 12/2020 | Massie | H04M 3/5183 |
| 11,012,562 B1 | 5/2021 | Walton et al. | |
| 11,637,923 B1 * | 4/2023 | Manzanillo | G06F 16/90332 |
| | | | 455/404.2 |
| 11,735,028 B2 * | 8/2023 | Williams, II | H04L 67/12 |
| | | | 706/8 |
| 11,805,189 B1 * | 10/2023 | Manzanillo | G06F 9/547 |
| 2008/0101553 A1 * | 5/2008 | Goldman | H04M 3/5116 |
| | | | 379/45 |
| 2016/0337831 A1 * | 11/2016 | Piett | H04M 3/42357 |
| 2019/0068784 A1 * | 2/2019 | Reddy | H04M 3/5116 |
| 2020/0304638 A1 * | 9/2020 | Jensen | H04L 67/565 |
| 2021/0152691 A1 * | 5/2021 | Walton | G06Q 50/265 |
| 2021/0352460 A1 * | 11/2021 | Rohde | G06F 40/284 |

FOREIGN PATENT DOCUMENTS

| | | |
|---|---|---|
| EP | 3654678 B1 | 3/2022 |
| WO | 2001047223 A2 | 6/2001 |

OTHER PUBLICATIONS

Unknown Author, "Social Media Monitoring by Catehgory with Event Detection for Resource and Offering Management," Oct. 17, 2017, pp. 1-4.

* cited by examiner

QUALITY ALERTING FOR COMPUTER-AIDED DISPATCH SYSTEMS

BACKGROUND

A user at a public safety answering point ("PSAP") may act as a call taker to handle emergency calls. The user or another user may also act as a dispatcher by entering computer-aided dispatch ("CAD") incident data to create new CAD incidents, or records, for emergency calls. A PSAP is often associated with one or more unresolved tasks to be dispatched.

Figure 1:
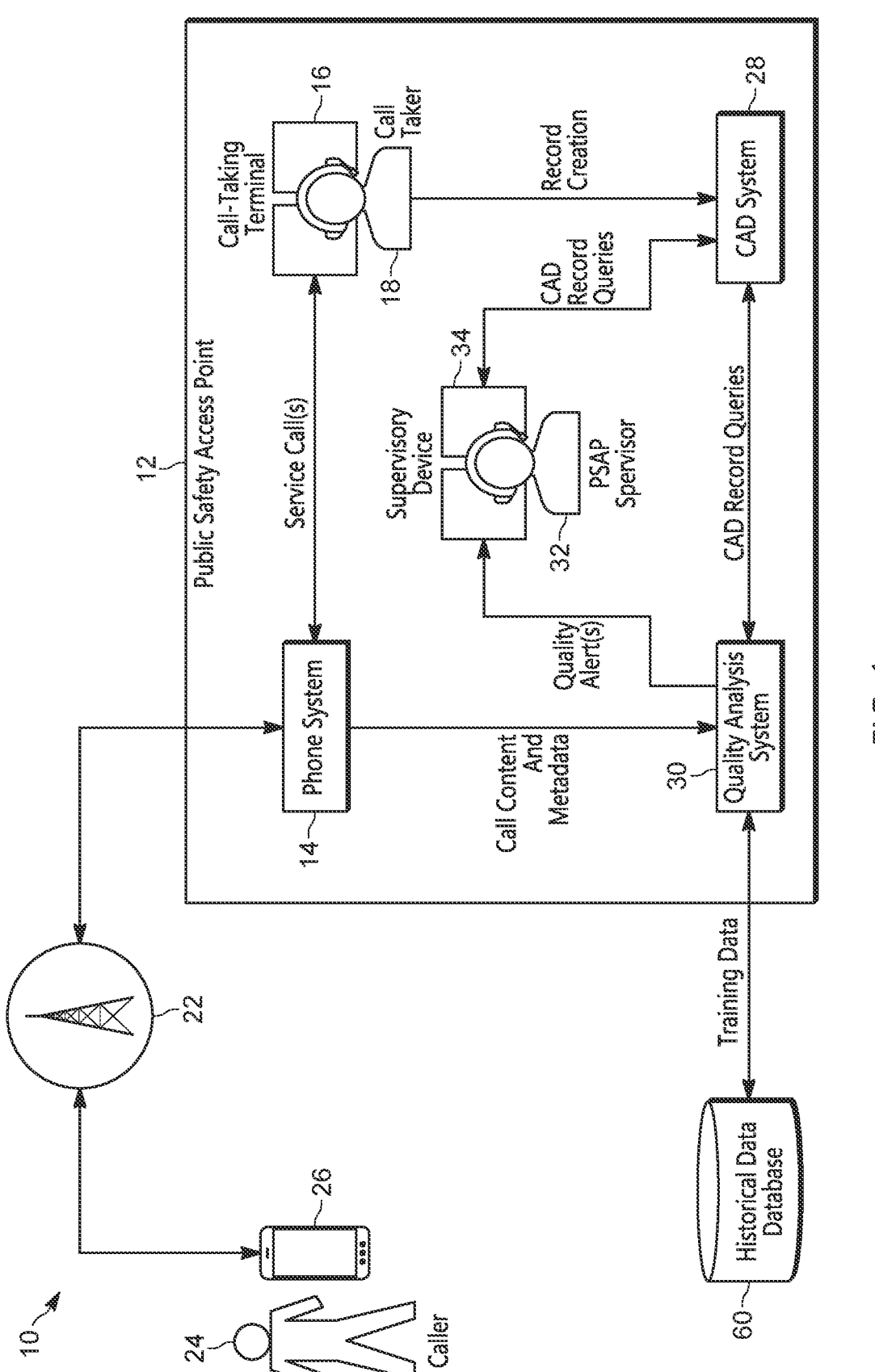
FIG. 1 illustrates a public safety communications system, according to some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION

Call takers in PSAPs are responsible for coordinating dispatch services for callers in emergencies. PSAPs rely on quality assurance specialists or supervisors to ensure that call takers perform these responsibilities. When call takers neglect to timely or accurately create CAD incident records, callers may be left in an emergency situation without proper emergency services being dispatched. Quality assurance operations can be very costly to municipalities, and budget constraints prohibit some municipalities from implementing effective quality assurance measures. Additionally, PSAPs serving large or dense areas that regularly experience high emergency call volume often lack the resources to provide sufficient quality assurance measures. In these cases, quality assurance specialists or other PSAP supervisors are only able to audit a very small amount of the calls that the PSAP handles (e.g., approximately 2% of calls).

Thus, there is a need for a quality assurance alerting system for flagging emergency calls that may have been improperly handled by a PSAP call taker and/or dispatcher. One example provides a public safety answering point ("PSAP") server including: an electronic processor; and a non-transitory computer-readable medium including program instructions that, when executed by the electronic processor, cause the PSAP server to perform a set of operations including: determining that a call taker of the PSAP has received a call from a caller regarding an incident; generating a transcript of the call; based on the transcript, determining a set of call attributes associated with the call; determining whether a computer-aided dispatch ("CAD") record associated with the call is created within a threshold time period from a start time of the call; in response to determining that the CAD record associated with the call is not created within the threshold time period, inferring, using a first artificial intelligence ("AI") model trained on historical data of transcripts of past calls and past CAD records, whether a CAD record associated with the call should be created based on the set of call attributes; and in response to inferring that a CAD record associated with the call should be created based on the set of call attributes, generating and transmitting a quality alert to an electronic device associated with a user of the PSAP.

In some aspects, the quality alert includes at least one selected from the group consisting of an identification of the call taker, a time of the call, the transcript of the call, a recording of the call, an identification of a CAD record associated with the call, and a time period between a start of the call and creation of a CAD record associated with the call.

In some aspects, the set of call attributes include at least one selected from the group consisting of an incident type, a name of a person involved in the incident, a name of the caller, an organization, a location of the incident, a location of the caller, a date, a tone of the caller, an indication by the call taker that an emergency service unit will be dispatched, and instructions provided by the call taker to the caller.

In some aspects, the set of operations further include: in response to determining that the CAD record associated with the call is created within the threshold time period, determining a set of CAD record attributes of the CAD record associated with the call; based on a comparison between a first subset of the call attributes and a first subset of the CAD attributes, inferring, using a second AI model trained on historical data of transcripts of past calls and past CAD records, whether emergency service units are sufficiently dispatched for the incident; and in response to inferring that emergency service units are not sufficiently dispatched for the incident, generating and transmitting a quality alert to an electronic device associated with a user of the PSAP.

In some aspects, inferring whether emergency service units are sufficiently dispatched includes at least one selected from the group consisting of inferring whether a sufficient type of emergency service unit is dispatched, inferring whether a sufficient quantity of emergency service units is dispatched for the incident, and inferring whether emergency service units are dispatched to a correct location.

In some aspects, the set of operations further include determining a set of metadata of the call, the set of metadata including at least one selected from the group consisting of a location of the caller, a caller ID of the caller, a phone number of the caller, a time of the call, a duration of the call, a weather condition at the location of the caller, and a set of historical metadata and call attributes associated with past calls from the caller; and inferring, using the second AI model, whether emergency service units are sufficiently dispatched for the incident based on a comparison between a first subset of metadata and a second subset of CAD record attributes.

In some aspects, the set of operations further include providing the transcript of the call and the CAD record as training data to the second AI model.

In some aspects, the threshold time period is a predetermined time period.

In some aspects, the historical data includes a historical distribution of past CAD record creation time periods, each past CAD record creation time period being a time period between a past receiving of a call by an emergency service provider and creation of a corresponding CAD record, and the set of operations further include determining the threshold time period based on the historical distribution.

In some aspects, the electronic processor is configured to determine the threshold time period according to a predetermined percentile of the historical distribution.

In some aspects, the set of call attributes include an incident type, and the historical distribution is conditioned on the incident type.

In some aspects, the data is based on data from a plurality of PSAPs.

In some aspects, the electronic processor determines the threshold time period using the first AI model.

In some aspects, the set of call attributes include an incident type, and the incident type includes at least one selected from the group consisting of a medical emergency, a mass casualty event, a theft, a domestic dispute, a break-in, a traffic accident, a robbery, an assault, a public threat, a mental health crisis, a weather-related incident, a fire, an administrative question from the caller, a follow-up regarding an active incident, and an accidental call.

Another example provides a PSAP server including: an electronic processor; and a non-transitory computer-readable medium including program instructions that, when executed by the electronic processor, cause the PSAP server to perform a set of operations including: determining that a call taker of the PSAP has received a call from a caller regarding an incident; generating a transcript of the call; based on the transcript, determining a set of call attributes associated with the call; identifying a CAD record associated with the call is created; determining a set of CAD record attributes of the CAD record associated with the call; based on a comparison between a first subset of the call attributes and a first subset of the CAD attributes, inferring, using a first AI model trained on historical data of transcripts of past calls and past CAD records, whether emergency service units are sufficiently dispatched for the incident; and in response to inferring that emergency service units are not sufficiently dispatched for the incident, generating and transmitting a quality alert to an electronic device associated with a user of the PSAP.

In some aspects, the quality alert includes at least one selected from the group consisting of an identification of the call taker, a time of the call, the transcript of the call, a recording of the call, an identification of a CAD record associated with the call, and a time period between a start of the call and creation of a CAD record associated with the call.

In some aspects, the set of call attributes include at least one selected from the group consisting of an incident type, a name of a person involved in the incident, a name of the caller, an organization, a location of the incident, a location of the caller, a date, a time, a tone of the caller, an indication by the call taker that an emergency service unit will be dispatched, an instructions provided by the call taker to the caller.

In some aspects, inferring whether emergency service units are sufficiently dispatched includes at least one selected from the group consisting of inferring whether a sufficient type of emergency service unit is dispatched, inferring whether a sufficient quantity of emergency service units is dispatched for the incident, and inferring whether emergency service units are dispatched to a correct location.

In some aspects, the set of operations further include: determining whether the CAD record associated with the call is created within a threshold time period from a start time of the call; in response to determining that the CAD record associated with the call is not created within the threshold time period, inferring, using a second AI model trained on historical data of transcripts of past calls and past CAD records, whether a CAD record associated with the call should be created based on the set of call attributes; and in response to inferring that a CAD record associated with the call should be created based on the set of call attributes, generating and transmitting a quality alert to an electronic device associated with a user of the PSAP.

Another example provides method for a PSAP server. The method incudes: determining that a call taker of the PSAP has received a call from a caller regarding an incident; generating a transcript of the call; based on the transcript, determining a set of call attributes associated with the call; determining whether a CAD record associated with the call is created within a threshold time period from a start time of the call; in response to determining that the CAD record associated with the call is not created within the threshold time period, inferring, using a first artificial intelligence ("AI") model trained on historical data of transcripts of past calls and past CAD records, whether a CAD record associated with the call should be created based on the set of call attributes; and in response to inferring that a CAD record associated with the call should be created based on the set of call attributes, generating and transmitting a quality alert to an electronic device associated with a user of the PSAP.

Examples are herein described with reference to flowchart illustrations and/or block diagrams of methods, apparatus (systems) and computer program products according to examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some examples, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

Further advantages and features consistent with this disclosure will be set forth in the following detailed description, with reference to the figures.

Referring now to the drawings, FIG. 1 illustrates an example public safety communications system 10. It should be understood that the system 10 is provided as one example and, in some instances, the system 10 may include fewer or additional components than those illustrated. As would be understood by one skilled in the art, FIG. 1 is a simplified diagram. Networks are more complex than the schematic elements depicted in FIG. 1.

In the illustrated example, the system 10 includes PSAP 12 (for example, an emergency call center) having a phone system 14, a call-taking terminal 16, and a call taker 18 associated with the call-taking terminal 16. While illustrated for simplicity as including a single call-taking terminal 16 and call taker 18, it should be understood that the PSAP 12 may include multiple call-taking terminals 16 and multiple call takers 18. Further, FIG. 1 is illustrated for simplicity as having a single entity (i.e., call-taker 18) operating as both a call-taker (i.e., the individual speaking with the caller 24) and a dispatcher (i.e., the individual who contacts first responders by, for example, creating a CAD record). However, PSAP roles may be distributed in various manners across PSAP staff. For example, call-taking operations and dispatch operations may be respectively performed by different individuals using separate computer terminals and who communicate with each other.

The PSAP 12 is communicatively connected to a communication network 22 and performs, among other things, computer-aided dispatch (CAD) operations to provide emergency services to callers, such as the caller 24 illustrated in FIG. 1. The call-taking terminal 16 includes, among other things, a processor (for example, a microprocessor or another suitable programmable device), a memory (i.e., a computer-readable storage medium), and one or more input devices, output devices, or input and output devices including, for example, one or more displays, keyboards, keypads, mice, joysticks, touchscreens, speakers, microphones, and headsets.

The components of the PSAP 12 are communicatively coupled using one or more wired and/or wireless networks. A call taker 18 interacts with the call-taking terminal 16 to answer communications, including calls made to 911, received at the PSAP 12. For example, a caller 24, using a communication device 26 (for example, a telephone, a smart telephone, a tablet computer, or another similar device capable of operating as described herein) places a call to 911 using the communication network 22 (for example, a cellular network, the public switched telephone network, the Internet, or another suitable network), and the call is routed to the PSAP 12.

The call taker 18 accesses a CAD system 28 (e.g., through a user interface device, such as the call-taking terminal 16) to create, modify, and/or view CAD records associated with calls from callers, such as the caller 24. A quality analysis system 30 is communicatively connected to the CAD system 28 and the phone system 14. While illustrated for simplicity as a single quality analysis system 30 residing at the PSAP 12, the quality analysis system 30 may alternatively be implemented in a distributed manner on-premises of and/or remote from the PSAP 12. For example, in some instances, the quality analysis system 30 is implemented in whole or in part by a cloud computing environment accessible by the PSAP 12. The quality analysis system 30, which is described in greater detail below with reference to FIGS. 2 and 3, analyzes call data received by the phone system 14 and CAD records stored in the CAD system 28. Based on the result of the analysis, the quality analysis system 30 may flag particular calls, CAD records, and/or the call taker 18 for review by a PSAP supervisor, such as the PSAP supervisor 32.

The PSAP supervisor 2 may be a quality assurance specialist or other PSAP user having authority over the call taker 18. The PSAP supervisor 32 is associated with a user interface device 34 (otherwise referred to herein as a supervisory device 34) for receiving alerts generated by the quality analysis system 30 with respect to flagged calls, CAD records, and/or call takers 18. The user interface device 34 may be communicatively connected to the CAD system 28 to enable the PSA supervisor review CAD records created by the call taker 18. The user interface device 34 may be, for example, a phone, a tablet, a computer, a laptop, a call-taking terminal, and/or the like. The PSAP supervisor 32 and the user interface device 34 may be located on-premises of or remote from the PSAP 12. Additionally, while illustrated for simplicity as a single PSAP supervisor 32, it should be understood that the PSAP 12 may include multiple PSAP supervisors 32.

Figure 2:
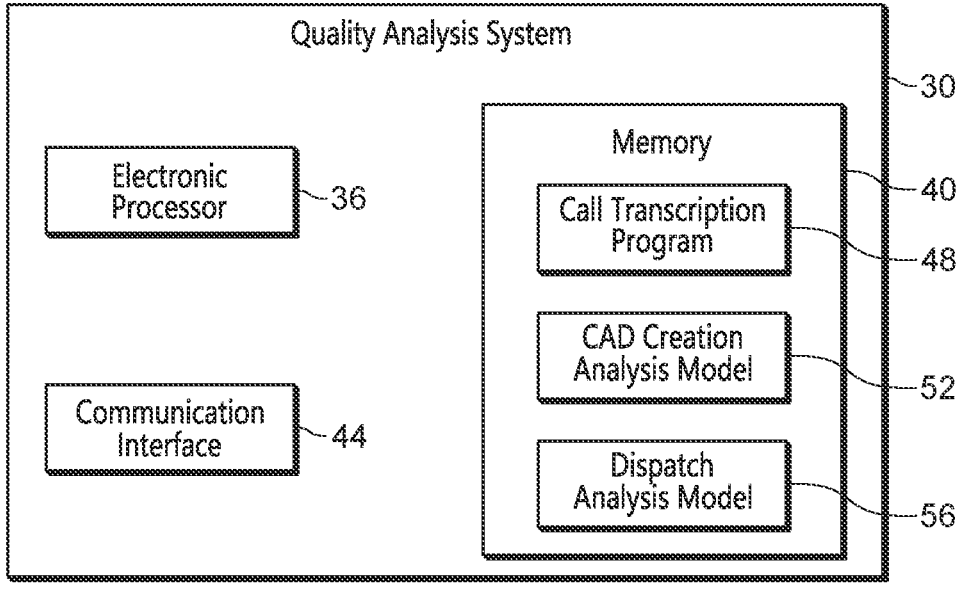
FIG. 2 illustrates a quality analysis system, according to some examples.

FIG. 2 schematically illustrates one example of the quality analysis system 30. In the example illustrated, the quality analysis system 30 includes an electronic processor 36 communicatively connected to a memory 40 and a communication interface 44. The electronic processor 36 includes suitable processing circuitry for performing the methods described herein or any combination of suitable processing circuitry. For example, the electronic processor 36 may include a digital signal processor (DSP), a graphics processing unit (GPU) embedded processor, a vision processing unit, etc. One or more circuit units included in the electronic processor 36 may operate independently or in parallel with one another.

The memory 40 may include read only memory (ROM), random access memory (RAM), other non-transitory computer-readable media, or a combination thereof. In the example shown, the memory 40 stores data and computer program instructions for performing, among other things, the methods described herein. For example, the memory 40 stores call transcription program data 48 for transcribing and/or performing speech recognition on calls received by the PSAP 12 (e.g., using a natural language model or the like).

The memory 40 may also store one or more artificial intelligence ("AI") models used by the electronic processor 36 for performing quality analysis of CAD records. For example, the memory 40 may store a CAD creation analysis model 52 (otherwise referred to herein as a first AI model) for inferring whether a CAD record should be created for respective calls received by the PSAP 12 based on the content of the call.

The memory 40 may also store a dispatch analysis model 56 (otherwise referred to herein as a second AI model) for inferring whether, when a CAD record is created for a received call, the CAD record indicates that emergency service units (e.g., emergency medical technician(s), police officer(s), firefighter(s), hazardous material management ("HAZMAT"), special weapons and tactics ("SWAT"), etc.) are sufficiently dispatched for the incident. Inferring whether emergency service units are sufficiently dispatched includes, for example, inferring whether a sufficient type of emergency service unit is dispatched, inferring whether a sufficient quantity of emergency service units is dispatched for the incident, and/or inferring whether emergency service units are dispatched to a correct location. For example, when a caller calls to report a mass casualty event and the CAD record indicates that only one ambulance is dispatched, the dispatch analysis model 56 may infer that emergency service units are not sufficiently dispatched.

The CAD creation analysis model 52 and the dispatch analysis model 56 are trained on historical data of transcripts of past calls and corresponding past CAD records received from, for example, the database 60 illustrated in FIG. 1. The historical data stored in the database 60 may include historical data from the PSAP 12 and/or other PSAPs 12 within or outside of the communication system 10. The database 60 may reside in whole or in part in the PSAP 12, and/or in whole or in part in a cloud environment.

The communication interface 44 sends and receives communications (e.g., call content from the phone system 14, CAD records from the CAD system 28, historical data from the database 60, results of quality analysis, etc.) to and from the quality analysis system 30 and other components of the system 10 (e.g., the database 60, the user interface device 34, the phone system 14, the call-taking terminal 16, and/or the like).

The quality analysis system 30 may include more or fewer components than those illustrated in FIG. 2. For example, the quality analysis system 30 may include more than two AI models (e.g., multiple CAD creating analysis models 52, multiple dispatch analysis models 56, and/or one or more other AI models).

Figure 3:
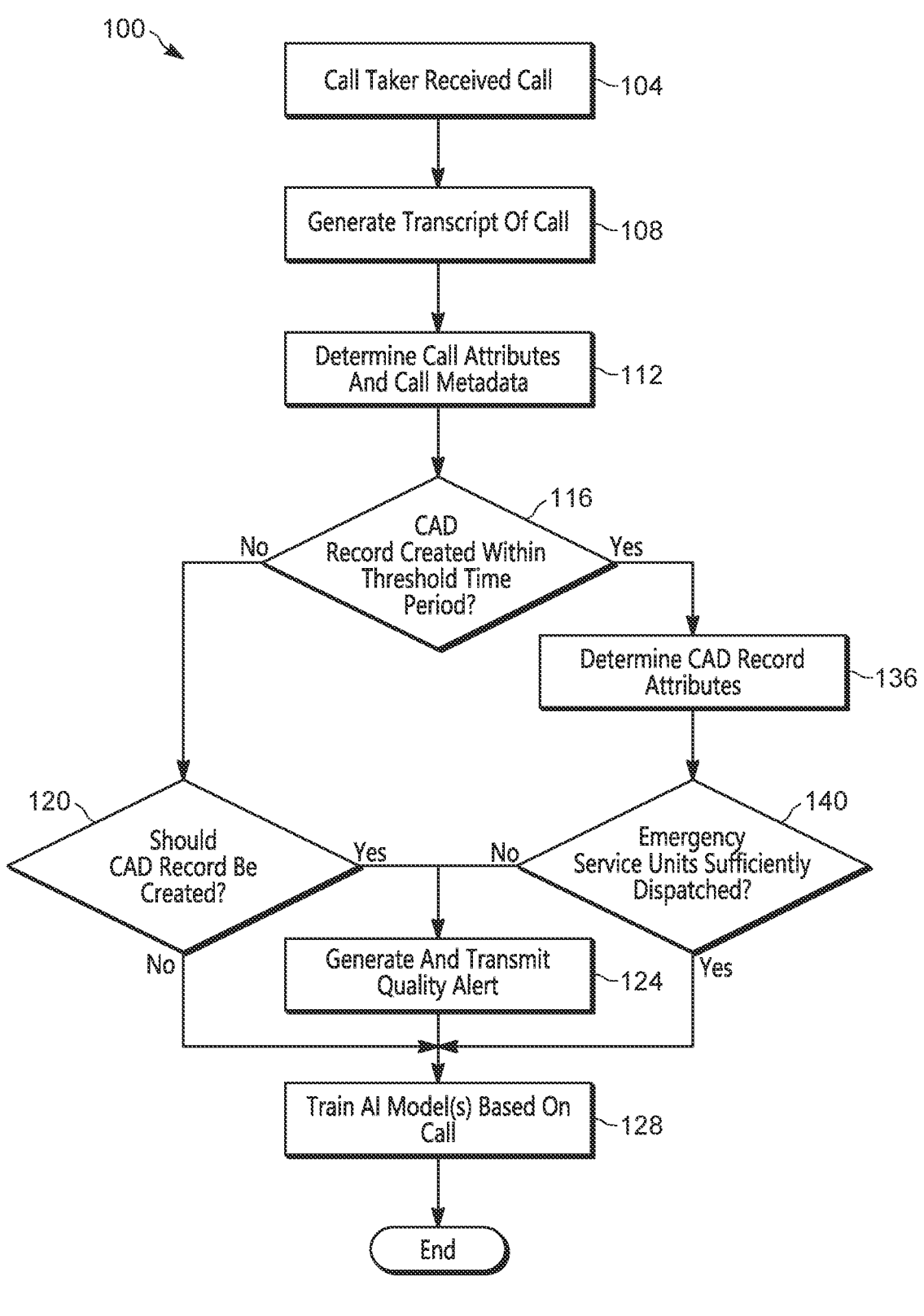
FIG. 3 illustrates a method for quality alerting for a public safety answering point, according to some examples.

FIG. 3 illustrates a method 100 implemented by, for example, the electronic processor 36, in conjunction with other components of the quality analysis system 30 and the communication system 10. The electronic processor 36 determines that the call taker 18 has received a call from the caller 24 regarding an incident (at block 104), and generates a transcription of the call (at block 108). In some examples, electronic processor 36 generates the transcription of the call in real-time or near real-time of the PSAP 12 receiving the call. In other examples, the electronic processor 36 generates the transcription of the call after competition of the call.

Based on the call content (i.e., the transcription and/or other information associated with the call), the electronic processor 36 determines a set of call attributes and/or a set of call metadata associated with the call (at block 112). The set of call attributes are entities, call topics, addresses, and the like associated with the call and extracted from the transcript by the electronic processor 36 (e.g., using one or more AI models). For example, the set of call attributes may include an incident type (i.e., a classification of the nature of the incident), a name or description of a person involved in the incident, a name of the caller, an organization (e.g., a business, group, or other organization referenced by the caller 24 in the call), a location of the incident, a location of the caller, a date (e.g., a date of the call and/or one or more dates referenced by the caller), a time (e.g., a time of the call and/or one or more times referenced by the caller), a tone of the caller (e.g., an emotional state of the caller 24 determined based on, for example, the caller's speech patterns), statements made by the call taker, and/or the like.

Incident types may include, for example, a medical emergency (e.g., an allergic reaction, a laceration, a fall, an overdose, etc.), a mass casualty event, a theft, a domestic dispute, a break-in, a traffic accident, an assault, a robbery, a fire, a public threat, a mental health crisis, a weather-related incident, an administrative question from the caller, a follow-up regarding an active incident, an accidental call, and/or the like.

The extracted location of the incident may be based on a specific address recited by the caller and/or a description of the location. For example, in response to the caller 24 reciting "I'm calling to report an incident at the supermarket on Main Street," the electronic processor 36 may determine (e.g., using map data) that the address of "the supermarket on Main Street" is "123 Main Street" and store the address "123 Main Street" and/or the description "the supermarket on Main Street" as a location attribute associated with the call.

Statements made by the call taker 18 may include instructions provided by the call taker 18 to the caller 24 (e.g., instructions to move to a specific location, instructions on how to perform cardiopulmonary resuscitation ("CPR"), instructions on how to assist someone who is choking, etc.). Statements made by the call taker 18 may also include, for example, an indication by the call taker that an emergency service unit will be dispatched, (e.g., "An ambulance is on its way.").

The electronic processor 36 may extract the set of call metadata based on information relating to the call that is not included in the transcript. For example, the set of call metadata may include a location of the caller (i.e., a location of the caller determined using positioning technology or landline location), a caller ID of the caller, a phone number of the caller, a date of the call, a time of the call, a duration of the call, a weather condition at the location of the caller, a set of historical metadata and call attributes associated with past calls from the caller, and/or the like. The set of historical metadata and call attributes may respectively include call metadata and call attributes associated with previous calls of the caller 24.

The electronic processor determines whether a CAD record associated with the call is created by the call taker 18 within a threshold time period from the start time of the call (at block 116). In some instances, the electronic processor 36 determines the threshold time period based on the historical data of the database 60. For example, the historical data may include a historical distribution of past CAD record creation time periods, each past CAD record creation time period being a time period between a past receiving of a call by an emergency service provider and creation of a corresponding CAD record. The electronic processor 36 may determine the threshold time period according to a predetermined percentile (e.g., a $90^{th}$ percentile, a $95^{th}$ percentile, a $99^{th}$ percentile, etc.) of the historical distribution. For example, the electronic processor may determine that a $99^{th}$ percentile of the historical distribution corresponds to a CAD record creation time period of four minutes, and accordingly determine the threshold time period to be four minutes.

In some instances, the historical distribution used by the electronic processor 36 to determine the threshold time period is conditioned according to the incident type. For example, a $99^{th}$ percentile of a historical distribution conditioned on an incident type of lacerations may be two minutes, while a $99^{th}$ percentile of a historical distribution conditioned on an incident type of noise complaints may be ten minutes.

In some instances, the threshold time period is a predetermined time period. The predetermined time period may be based on, for example, the incident type.

When the electronic processor 36 determines that a CAD record associated with the call is created by the call taker 18 within a threshold time period from the start time of the call ("NO" at block 116), the electronic processor infers (e.g., using the CAD creation analysis model 52), whether a CAD record associated with the call should be created based on the set of call attributes and/or the set of call metadata. Based on the set of call attributes, the set of call metadata, and the historical data used to train the CAD creation analysis model 52, the electronic processor 36 may infer that certain types of incidents always require a new CAD record to be created, other types of incidents require that a new CAD record sometimes be created, and still other types of incidents never require that a new CAD record be created. For example, the electronic processor 36 may infer, with the CAD creation analysis model 52, that a call by the caller 24 to follow-up regarding a previously created, or active, CAD record, or to ask an administrative question, does not require creation of a new CAD record in the CAD system 28. In contrast, the electronic processor 36 may infer, with the CAD creation analysis model 52, that a traffic accident does require creation of a new CAD record in the CAD system 28.

When the electronic processor 36 infers that a CAD record should be created for the incident ("YES" at block 120), the electronic processor 36 generates and transmits a quality alert for the call to the user interface device 34 associated with the PSAP supervisor 32 (at block 124). The quality alert generated at block 124 is described in greater detail below.

When the electronic processor 36 infers that a CAD record should not be created for the incident ("NO" at block 120) and/or responsive to generating the quality alert (at block 124), the electronic processor 36 may use the call content and/or information associated with the call (e.g., the transcript, the call attributes, the call metadata, etc.) as training data for the CAD creation analysis model 52 so that quality analysis system 30 may analyze future calls in a manner that is more specific to the PSAP 12 (at block 128). For example, the electronic processor 36 may transmit the call content and/or information associated with the call to the database 60.

When the electronic processor 36 determines that a CAD record is created within the threshold time period ("YES" at block 116), the electronic processor 36 determines a set of CAD record attributes of the CAD record associated with the call (at block 136). The CAD record attributes may include for example, a time that the CAD record was created, an identification of who created the CAD record (e.g., the call taker 18), a location of the incident (e.g., an address and/or a description of the location), a description of the incident, an identification (e.g., names and/or descriptions) of individuals and/or organizations involved in the incident, dates and/or times associated with the incident, an indication of types and/or quantities emergency service units dispatched to respond to the incident, and/or the like.

Based on a comparison of some or all (i.e., a first subset) of the call attributes and call metadata (e.g., the call attributes and call metadata determined at block 112) with some or all (i.e., a first subset) of the CAD attributes, the electronic processor 36 infers, using the dispatch analysis model 56, whether emergency service units are sufficiently dispatched for the incident (at block 140). As described above, inferring whether emergency service units are sufficiently dispatched includes, for example, inferring whether a sufficient type of emergency service unit is dispatched, inferring whether a sufficient quantity of emergency service units is dispatched for the incident, and/or inferring whether emergency service units are dispatched to a correct location.

For example, the electronic processor 36 may determine that a location attribute for the call indicates that the incident is at "123 Main Street" while a location attribute for the CAD record indicates that the incident is at "223 Main Street," and, as a result, infers that emergency service units are not sufficiently dispatched for the incident.

As another example, the electronic processor 36 may determine that, for incidents having the same incident type attribute, location attribute, incident time attribute, and/or the like, the PSAP 12 typically dispatches a police officer along with other required emergency service units for all incidents in the area. In such instances, when the electronic processor 36 determines that the CAD record indicates that only an ambulance is dispatched for the incident, the electronic processor 36 may infer that sufficient types of emergency service units are not dispatched for the incident.

As another example, when the electronic processor 36 determines, based on the call attributes, that the call taker 18 stated to the caller 24 "I'm sending you an ambulance," while the CAD record indicates that only a police officer is dispatched, the electronic processor 36 may infer that sufficient types of emergency service units are not dispatched for the incident.

When the electronic processor 36 infers that emergency service units are not sufficiently dispatched for the incident ("NO" at block 140), the electronic processor 36 generates a quality alert for the call and transmits the quality alert to the user interface device 34 associated with the PSAP supervisor 32 (at block 140).

The quality alert may be transmitted to the user interface device 34 associated with the PSAP supervisor 32 in the form of, for example, a text message, an email, a phone call, an application notification, and/or the like. The quality alert indicates that the call taker's handling of the call may be insufficient and may require further review by the PSAP supervisor 32. The quality alert may include, for example, an identification of the call taker 18 (e.g., a name, an employee identification number, an identifier of the call-taking terminal 16, etc.), a time of the call, the transcript of the call, a summary of the transcript (e.g., generated by the electronic processor 36, the call-taker 18, and/or other PSAP staff), a recording of the call, a time period between a start of the call and creation of a CAD record associated with the call, a name of the caller, an identification of a CAD record associated with the call, and/or other information usable by the PSAP supervisor 32 to assess the response of the call taker 18. By transmitting quality alerts regarding suspected insufficient handling of calls, PSAPS 12 and PSAP supervisors 32 are better able to focus their limited resources (e.g., time and money) toward auditing calls that have a high likelihood of having been handled insufficiently.

When the electronic processor 36 infers that emergency service units are sufficiently dispatched for the call ("YES" at block 140) and/or responsive to generating the quality alert (at block 124), the electronic processor 36 may use the call content and/or information associated with the call (e.g., the transcript, the call attributes, the call metadata, etc.) as training data for the CAD creation analysis model 52 so that quality analysis system 30 may analyze future calls in a manner that is more specific to the PSAP 12 (at block 128). For example, different PSAPs 12 may have different procedures and standards regarding under what circumstances a CAD record should be created, how quickly a CAD record should be created, and what thresholds define sufficiently dispatch emergency service units, and what types of emergency services are available to be dispatched (for example, some PSAPs 12 may implement emergency telemedicine procedures while other PSAPs 12 do not).

In some instances, responsive to the PSAP supervisor 32 receiving and reviewing the quality alert generated and transmitted at block 124, the electronic processor 36 receives from the user interface device 34 associated with the PSAP supervisor 32, either a rejection or a confirmation of the quality alert. The confirmation indicates, for example, a determination by the PSAP supervisor 32 that the inference made by the electronic processor 36 using the CAD creation analysis model 52 and/or the dispatch analysis model 56 (e.g., at block 120 and/or block 140) is a correct inference. In contrast, the rejection indicates, for example, a determination by the PSAP supervisor 32 that the inference made by the electronic processor 36 using the CAD creation analysis model 52 and/or the dispatch analysis model 56 (e.g., at block 120 and/or block 140) is an incorrect inference. In addition to the transcript, CAD record, and/or other call information, the electronic processor 36 may also use the confirmation or rejection as training data for training the CAD creation analysis model 52 and/or the dispatch analysis model 56.

In the foregoing specification, various examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and ""they"" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/ or hardware. For example, instead of being located within and performed by a single electronic processor, logic and processing described herein may be distributed among multiple electronic processors. Similarly, one or more memory modules and communication channels or networks may be used even if examples described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combination of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various examples may be written in an object oriented programming language such as Java, Smalltalk, C++, Python, or the like. However, the computer program code for carrying out operations of various examples may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A public safety answering point ("PSAP") server comprising:

an electronic processor; and a non-transitory computer-readable medium comprising program instructions that, when executed by the electronic processor, cause the PSAP server to perform a set of operations comprising:

determining that a call taker of the PSAP has received a call from a caller regarding an incident;

generating a transcript of the call;

based on the transcript, determining a set of call attributes associated with the call;

determining whether a computer-aided dispatch ("CAD") record associated with the call is created within a threshold time period from a start time of the call;

in response to determining that the CAD record associated with the call is not created within the threshold time period, inferring, using a first artificial intelligence ("AI") model trained on historical data of transcripts of past calls and past CAD records, whether a CAD record associated with the call should be created based on the set of call attributes; and in response to inferring that a CAD record associated with the call should be created based on the set of call attributes, generating and transmitting a quality alert to a supervisory device associated with a supervisor of the PSAP.

2. The server of claim 1, wherein the quality alert includes at least one selected from the group consisting of an identification of the call taker, a time of the call, the transcript of the call, a recording of the call, an identification of a CAD record associated with the call, and a time period between a start of the call and creation of a CAD record associated with the call.

3. The server of claim 1, wherein the set of call attributes include at least one selected from the group consisting of an incident type, a name of a person involved in the incident, a name of the caller, an organization, a location of the incident, a location of the caller, a date, a tone of the caller, an indication by the call taker that an emergency service unit will be dispatched, and instructions provided by the call taker to the caller.

4. The server of claim 1, wherein the set of operations further comprise:

in response to determining that the CAD record associated with the call is created within the threshold time period, determining a set of CAD record attributes of the CAD record associated with the call;

based on a comparison between a first subset of the call attributes and a first subset of the CAD attributes, inferring, using a second AI model trained on historical data of transcripts of past calls and past CAD records, whether emergency service units are sufficiently dispatched for the incident; and in response to inferring that emergency service units are not sufficiently dispatched for the incident, generating and transmitting a quality alert to an electronic device associated with a user of the PSAP.

5. The server of claim 4, wherein inferring whether emergency service units are sufficiently dispatched includes at least one selected from the group consisting of inferring whether a sufficient type of emergency service unit is dispatched, inferring whether a sufficient quantity of emergency service units is dispatched for the incident, and inferring whether emergency service units are dispatched to a correct location.

6. The server of claim 4, wherein the set of operations further comprise determining a set of metadata of the call, the set of metadata including at least one selected from the group consisting of a location of the caller, a caller ID of the caller, a phone number of the caller, a time of the call, a duration of the call, a weather condition at the location of the caller, and a set of historical metadata and call attributes associated with past calls from the caller; and inferring, using the second AI model, whether emergency service units are sufficiently dispatched for the incident based on a comparison between a first subset of metadata and a second subset of CAD record attributes.

7. The server of claim 4, wherein the set of operations further comprise providing the transcript of the call and the CAD record as training data to the second AI model.

8. The server of claim 1, wherein the threshold time period is a predetermined time period.

9. The server of claim 1, wherein the historical data includes a historical distribution of past CAD record creation time periods, each past CAD record creation time period being a time period between a past receiving of a call by an emergency service provider and creation of a corresponding CAD record, and the set of operations further comprise determining the threshold time period based on the historical distribution.

10. The server of claim 9, wherein the electronic processor is configured to determine the threshold time period according to a predetermined percentile of the historical distribution.

11. The server of claim 9, wherein the set of call attributes include an incident type, and the historical distribution is conditioned on the incident type.

12. The server of claim 1, wherein the data is based on data from a plurality of PSAPs.

13. The server of claim 1, wherein the electronic processor determines the threshold time period using the first AI model.

14. The server of claim 1, wherein the set of call attributes include an incident type, and the incident type includes at least one selected from the group consisting of a medical emergency, a mass casualty event, a theft, a domestic dispute, a break-in, a traffic accident, a robbery, an assault, a public threat, a mental health crisis, a weather-related incident, a fire, an administrative question from the caller, a follow-up regarding an active incident, and an accidental call.

15. A public safety answering point ("PSAP") server comprising:

an electronic processor; and a non-transitory computer-readable medium comprising program instructions that, when executed by the electronic processor, cause the PSAP server to perform a set of operations comprising:

determining that a call taker of the PSAP has received a call from a caller regarding an incident;

generating a transcript of the call;

based on the transcript, determining a set of call attributes associated with the call;

identifying a computer-aided dispatch ("CAD") record associated with the call is created;

determining a set of CAD record attributes of the CAD record associated with the call;

based on a comparison between a first subset of the call attributes and a first subset of the CAD attributes, inferring, using a first AI model trained on historical data of transcripts of past calls and past CAD records, whether emergency service units are sufficiently dispatched for the incident; and in response to inferring that emergency service units are not sufficiently dispatched for the incident, generating and transmitting a quality alert to a supervisory device associated with a supervisor of the PSAP.

16

16. The server of claim 15, wherein the quality alert includes at least one selected from the group consisting of an identification of the call taker, a time of the call, the transcript of the call, a recording of the call, an identification of a CAD record associated with the call, and a time period between a start of the call and creation of a CAD record associated with the call.

17. The server of claim 15, wherein the set of call attributes include at least one selected from the group consisting of an incident type, a name of a person involved in the incident, a name of the caller, an organization, a location of the incident, a location of the caller, a date, a time, a tone of the caller, an indication by the call taker that an emergency service unit will be dispatched, an instructions provided by the call taker to the caller.

18. The server of claim 15, wherein inferring whether emergency service units are sufficiently dispatched includes at least one selected from the group consisting of inferring whether a sufficient type of emergency service unit is dispatched, inferring whether a sufficient quantity of emergency service units is dispatched for the incident, and inferring whether emergency service units are dispatched to a correct location.

19. The server of claim 15, wherein the set of operations further comprise:

determining whether the CAD record associated with the call is created within a threshold time period from a start time of the call;

in response to determining that the CAD record associated with the call is not created within the threshold time period, inferring, using a second AI model trained on historical data of transcripts of past calls and past CAD records, whether a CAD record associated with the call should be created based on the set of call attributes; and in response to inferring that a CAD record associated with the call should be created based on the set of call attributes, generating and transmitting a quality alert to an electronic device associated with a user of the PSAP.

20. A method for a public safety answering point ("PSAP") server, the method comprising:

determining that a call taker of the PSAP has received a call from a caller regarding an incident;

generating a transcript of the call;

based on the transcript, determining a set of call attributes associated with the call;

determining whether a computer-aided dispatch ("CAD") record associated with the call is created within a threshold time period from a start time of the call;

in response to determining that the CAD record associated with the call is not created within the threshold time period, inferring, using a first artificial intelligence ("AI") model trained on historical data of transcripts of past calls and past CAD records, whether a CAD record associated with the call should be created based on the set of call attributes; and in response to inferring that a CAD record associated with the call should be created based on the set of call attributes, generating and transmitting a quality alert to a supervisory device associated with a supervisor of the PSAP.

* * * * *